United States Patent Office 3,635,912
Patented Jan. 18, 1972

3,635,912
POLYAMIDES FROM 13,14 - DIAZATRICYCLO
[6,4.1.1$^{2,7}$]TETRADECANE AND 13,14 - DI-
AZATRICYCLO[6.4.1.1$^{2,7}$]TETRADECA - 3,5,9,11-
TETRAENE
Alexander L. Johnson, Wilmington, Del., assignor to E. I.
du Pont de Nemours and Company, Wilmington, Del.
No Drawing. Original application Feb. 25, 1966, Ser. No.
529,961, now Patent No. 3,475,433. Divided and this
application June 27, 1969, Ser. No. 837,348
Int. Cl. C08g 20/20
U.S. Cl. 260—78 R                    6 Claims

ABSTRACT OF THE DISCLOSURE

Film and fiber forming polyamides from 13,14-diaza-
tricyclo[6.4.1.1$^{2,7}$]tetradecane and 13,14 - diazatricyclo-
[6.4.1.1$^{2,7}$]tetradeca-3,5,9,11-tetraene.

RELATED APPLICATION

This application is a division of my copending appli-
cation Ser. No. 529,961 filed Feb. 25, 1966 now U.S. Pat.
3,475,433.

BACKGROUND OF THE INVENTION

Field of the invention

This invention relates to, and has as its principal ob-
jects provision of, polyamides, polyurethanes and poly-
amines from 13,14 - diazatricyclo[6.4.1.1.$^{2,7}$]tetradecane
and 13,14 - diazatricyclo[6.4.1.1$^{2,7}$]tetradeca - 3,5,9,11-
tetraene.

Prior art

In the Marsh U.S. Pat. 3,268,512 of Aug. 23, 1966,
there are described and claimed dimeric azepines of the
general formula wherein X represents certain substituents and $m$ is a
cardinal number in the range 0–6, inclusive, denoting the
number of valences on the depicted carbons filled by sub-
stituents X.

In my copending application Ser. No. 529,961 of which
this application is a division, it is disclosed that the
N-cyanozepine dimer of the foregoing general formula,
where $m=0$, rearranges to a more stable and novel di-
azotricyclotetradecatetraene. The rearranged compound
is partially hydrolyzed to the unsaturated diamine of the
formula below 13,14-diazatricyclo[6.4.1.1$^{2,7}$]tetradeca-3,5,9,11-tetraene This compound in turn is hydrogenated to the satu-
rated diamine of the formula 13,14-diazatricyclo[6.4.1.1$^{2,7}$]tetradecane Both the unsaturated and saturated diamine form the
usual hydrohalide salts such as the hydrochloride or hydro-
bromide which can be isolated from aqueous solution.

DESCRIPTION OF THE INVENTION

The present invention comprises the preparation of
useful polymers from the aforesaid unsaturated diamine
and saturated diamine by reacting them with appropriate
reactants.

EMBODIMENTS OF THE INVENTION

There follow some nonlimiting examples illustrating the
invention in more detail. All temperature values given
are in degrees centigrade.

It may be noted that Formula I can be written to
show the trans and cis stereoisomeric forms trans                    cis Formula II can similarly be written to show the trans
and cis stereoisomers of the saturated diamine and dif-
fers from the above of course in having the double bonds
removed.

EXAMPLE 1

Preparation of a polyamide from 13,14 - diazatricyclo-
[6.4.1.1$^{2,7}$]tetradeca - 3,5,9,11 - tetraene and adipic
acid 13,14 - diazatricyclo[6.4.1.1$^{2,7}$]tetradeca - 3,5,9,11 - tet-
raene (0.27 g.) was suspended in a mixture of dichloro-
methane (10 ml.), water (40 ml.) and sodium hydroxide
(0.12 g.) in a 300-ml. tall-form beaker. This mixture was agitated with a high-speed stirrer and treated at once with adipoyl chloride (0.25 g.). After 10 minutes' stirring, the liquid was boiled for 5 minutes to remove dichloromethane, and then it was cooled to 0° and filtered to remove the white polymeric suspension. The residue was washed thoroughly with water and dried to a white powder (0.46 g., 100%), M.P. 330°. It was soluble in tetrafluorodichloroacetone hydrate and in trifluoroacetic acid.

*Analysis.*—Calcd. for $(C_{18}H_{20}N_2O_2)_n$ (percent): C, 72.95; H, 6.80; N, 9.45. Found (percent): C, 69.10, 69.25; H, 6.86, 6.94; N, 8.59, 8.76.

IR: $\nu_{max.}^{Nujol}$ 3500 cm.$^{-1}$ (bw) (NH,CO$_2$H)
3030 cm.$^{-1}$ (w) (CH=CH)
1720 cm.$^{-1}$ (w) (CO$_2$H)
1630 cm.$^{-1}$ (vs) (NCOR)
750 cm.$^{-1}$ (s) (C=C)

NMR(CF$_2$ClCOCF$_2$Cl·D$_2$O): $\tau=$
4.03 8 vinyl protons
5.50 exchange signal HDO
7.58 4 CH$_2$ protons adjacent to C=O
8.33 4 CH$_2$ protons remote from C=O The method of Example 1 was essentially employed to make additional polymers from 1 g. of 13,14-diazatricyclo[6.4.1.1$^{2,7}$]tetradeca - 3,5,9,11 - tetraene and 1 g. of various diacid chlorides [A(COCl)$_2$]. Data for these preparations are given in the following table:

| | | Polymer | | | | | | |
|---|---|---|---|---|---|---|---|---|
| | | | Anal., percent | | | | | Inh. visc. |
| Example | A(COCl)$_2$ | M.P., °C. | C | H | N | I.R., cm.$^{-1}$ (KBr, $\nu$ max.) | NMR, $\tau$ (CF$_3$CO$_2$H) | (CF$_3$CO$_2$H, 0.25%, 25° C.) |
| 2 | Adipoyl chloride | 248 | 70.61<br>70.66 | 7.13<br>7.31 | 8.93<br>8.81 | 3,050<br>1,721<br>1,645 | 4.37<br>4.80<br>5.52<br>7.81<br>8.70 | 0.26 |
| 3 | Suberoyl chloride | 230 | 71.24<br>71.36 | 7.52<br>7.87 | 7.86<br>7.89 | 3,050<br>1,730<br>1,650 | 4.32<br>4.75<br>5.46<br>7.73<br>8.93 | Insoluble |
| 4 | Sebacoyl chloride | 148–150 | 72.42<br>72.54 | 8.29<br>8.34 | 7.55<br>7.62 | 3,030<br>1,650 | 4.28<br>4.74<br>5.45<br>7.71<br>8.99 | 0.66 |
| 5 | Ethylene glycol bis-chloroformate | 100–105 | 58.91<br>58.87 | 5.48<br>5.36 | 7.67<br>7.62 | 3,030<br>1,710 | 4.41<br>5.37<br>5.93 | 0.09 |

Note.—The polymers of Examples 1, 2, 3, and 4 are polyamides. That of Example 5 is a polyurethane.

The polymers of Examples 2, 3 and 4 were pressed into films at a pressure of 500 p.s.i. and temperatures near their melting points. The films were self-supporting, those from 2 and 4 being somewhat brittle and that from 3 being flexible. A film from 3 (0.0036" thick) showed the following properties:

Refractive index: 1.57
Resistivity: >10$^{15}$ ohm cm.
Tensile strength:
   7360 lb., 4.4% elongation at break
   5240 lb., 3.0% elongation at break
   7160 lb., 4.5% elongation at break
Stiffness:
   172,000 p.s.i.
   160,000 p.s.i.

EXAMPLE 6

Preparation of a polyamide from 13,14-diazatricyclo [6.4.1.1$^{2,7}$]tetradecane and adipic acid

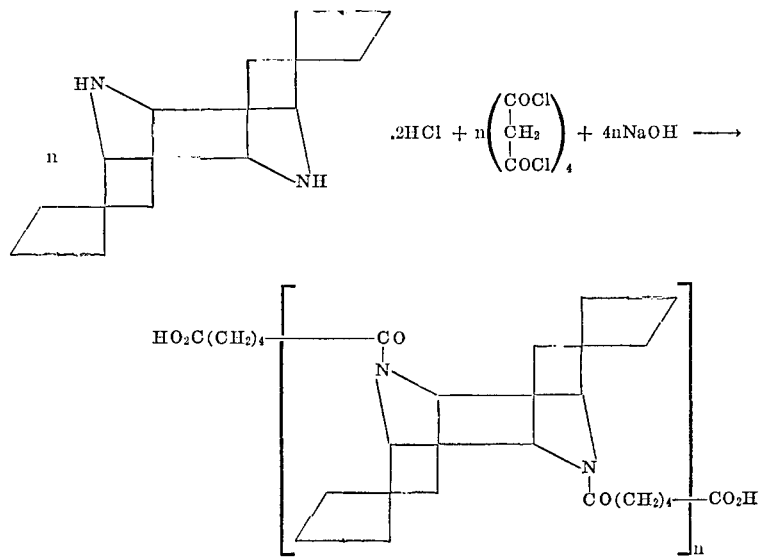

13,14 - diazatricyclo[6.4.2.1^{2,7}]tetradecane hydrochloride (0.53 g.) was suspended in a mixture of dichloromethane (10 ml.) and water (40 ml.), stirred rapidly, and treated in succession with sodium hydroxide (0.32 g.) and adipoyl chloride (0.36 g.). The white powdery polymer was isolated as described in Example 1 (80 mg.), M.P. >315° (dec.).

*Analysis.*—Calcd. for $(C_{18}H_{28}N_2O_2)_n$ (percent): C, 71.01; H, 9.27; N, 9.20. Found (percent): C, 66.33, 66.34; H, 8.73, 8.79; N, 9.43, 928.

IR.:$\nu_{max}^{KBr}$  3450 cm.$^{-1}$ (m) (NH, $CO_2H$)
2940, 2860 cm.$^{-1}$ (w) (CH)
1740 cm.$^{-1}$ (vw) $CO_2H$
1640 cm.$^1$ (vs) (NCOR)

The method of Example 6 was employed to make additional polymers from 1 g. of 13,14-diazatricyclo[6.4.1.1^{2,7}]tetradecane and 1 g. of various diacid chlorides

[A(COCl)$_2$]

Data for these preparations are given in the following table:

| Example | A(COCl)₂ | Polymer M.P., °C. | Anal., percent C | H | N | I.R., cm.⁻¹ (KBr, ν max.) | NMR, τ (CF₃CO₂H) | Inh. visc. (CF₃CO₂H, 0.25%, 25° C.) |
|---|---|---|---|---|---|---|---|---|
| 7 | Adipoyl chloride | >305 | 70.21 / 69.70 | 9.49 / 9.45 | 9.14 / 8.83 | 2,910 / 1,640 / 1,430 | 5.34 / 6.02 / 7.45 / 8.50 / 8.77 | 0.38 |
| 8 | Suberoyl chloride | 184–185 | 70.04 / 70.42 | 9.08 / 9.01 | 8.28 / 8.28 | 2,910 / 1,640 / 1,450 | 5.41 / 6.02 / 7.59 / 8.78 | 0.64 |
| 9 | Sebacoyl chloride | 69–71 | 72.31 / 72.26 | 9.79 / 9.79 | 8.64 / 8.58 | 2,940 / 1,640 / 1,450 | 5.40 / 6.05 / 7.60 / 8.87 | 0.23 |
| 10 | Ethylene glycol bis-chloroformate | 105–110 | 58.1 / 58.06 | 7.33 / 7.41 | 8.24 / 8.21 | 2,940 / 1,695 / 1,430 | 5.54 / 5.76 / 8.50 | 0.09 |

NOTE.—The polymers of Examples 6, 7, 8, and 9 are polyamides. That of Example 10 is a polyurethane.

The polymers of Examples 7, 8, 9 and 10 were pressed into films at a pressure of 500 p.s.i. and temperatures near their melting points. The films were all self-supporting though somewhat brittle. A film from Example 8 (0.0036" thick) showed the following properties:

Refractive inndex: 1.548
Resistivity: 4×10^{17} ohm cm.
Tensile strength:
    5490 lb., 45% elongation at break
    5510 lb., 41.3% elongation at break
    4440 lb., 36% elongation at break
Stiffness:
    147,000 p.s.i.
    123,900 p.s.i.

EXAMPLE 11

Poly(13,14-diazatricyclo[6.4.1.1^{2,7}]tetradecane terephthalamide

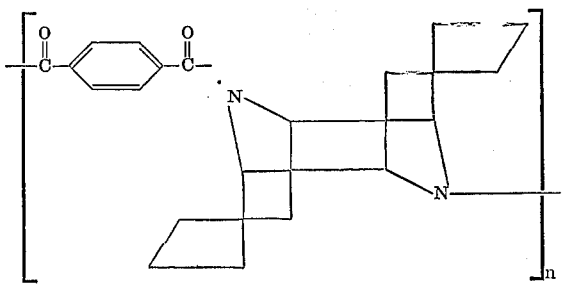

13,14-diazatricyclo[6.4.1.1^{2,7}]tetradecane (4.27 g., vacuum sublimed in chloroform (125 ml., chromatographed) and sodium hydroxide (1.8 g.) in 150 ml. of water (cooled to 0°), were mixed in a high speed stirrer. To these stirred ingredients was added rapidly terephthaloyl chloride (4.46 g., vacuum distilled and vacuum sublimed) in chloroform (25 ml., chromatographed on acid-washed alumina), cooled to 0°, and the combined ingredients stirred for 5 minutes. One liter of n-hexane was added to precipitate the product, which was collected, washed with water, and dried at 100°/1 mm. to give poly(13,14-diazatricyclo[6.4.1.1^{2,7}]tetradecane terephthalamide), 6.6 g., $\eta_{inh}$ (m-cresol)=0.66, polymer melt temperature >360°. The product has the repeating structural unit shown above.

EXAMPLE 12

Poly(13,14-diazatricyclo[6.4.1.1^{2,7}]tetradecane isophthalamide)

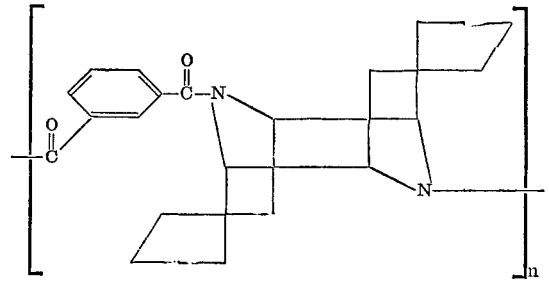

The procedure of Example 11 was repeated, employing isophthaloyl chloride in place of the terephthaloyl chloride. The product was 7.12 g. of poly(13,14-diazatricyclo[6.4.1.1^{2,7}]tetradecane isophthalamide) having an inherent viscosity of 1.10 in m-cresol. It was readily pressed into a tough, self-supporting film under heat and pressure and has the repeating structural unit shown above.

EXAMPLE 13

Polyamine from 13,14-diazatricyclo[6.4.1.1^{2,7}]tetradecatetraene and p-xylylene dibromide A mixture of 1.0 g. of 13,14-diazatricyclo[6.4.1.1^{2,7}]tetradeca-3,5,9,11-tetraene, 1.50 g. of p-xylylene dibromide, 0.60 g. of anhydrous sodium carbonate and 50 ml. of absolute ethanol was heated at reflux for 20 hours and then evaporated to dryness. The residue was stirred with water and adjusted to pH 11 by addition of 25% aqueous sodium hydroxide. The pinkish residue was collected by filtration, washed with water and air dried to obtain 2.10 g. of a solid polyamine having the repeating structural unit shown above. The product melted above 375° and had an inherent viscosity of 0.25 in CF₃CO₂H at 25°.

When the tetraene used in Example 13 is replaced by the corresponding tetradecane, Formula II, the polymer obtained has the structure

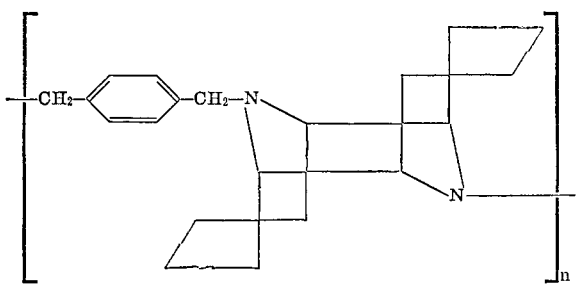

These polyamines are particularly useful for the preparation of polymeric acid acceptors. They can be blended with inert polymers and subsequently dyed with acid colors.

The film and/or fiber forming polymers of this invention have a recurring structural unit of the group consisting of

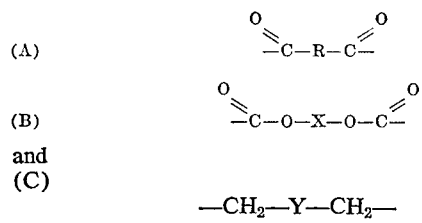

wherein D is a divalent organic radical selected from the (A)     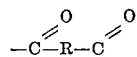

(B)     $-\overset{O}{\underset{\parallel}{C}}-O-X-O-\overset{O}{\underset{\parallel}{C}}-$ and
(C)     $-CH_2-Y-CH_2-$ wherein R is alkylene of 3 to 14 carbon atoms or arylene of 6 to 14 carbon atoms; X is alkylene or oxygen-interrupted alkylene of 2 to 14 carbon atoms; and Y is alkylene of 1 to 14 carbon atoms or arylene of 6 to 14 carbon atoms. The divalent radicals R, X and Y are composed primarily of carbon and hydrogen and merely serve as inert carrier for the two reactive end groups on the difunctional acids, acid halides or dihalides used in the polymer-forming reaction with the diamines. Thus the polymers of the invention are derived by reaction of the corresponding diamines (I and II) with suitable difunctional acids, acid halides or dihalides under conventional polymer formng conditions.

The proportions of the reactants may be varied widely. They may be used in the ratio of 99.9 to 1 mole percent of diamine and 0.1 to 99 mole percent of the other reactant.

When the diamines are reacted with dibasic acids or their amide-forming derivatives, polyamides are obtained by conventional techniques. These polymers are useful for film or fiber applications where resistance to high temperature is desired. Suitable examples of dibasic acids or amide-forming derivatives thereof have their carboxylic groups separated by a hydrocarbyl diradical or alkylene group R of at least 3 carbons and preferably 4–14 carbons as derived from glutaric, adipic, pimelic, suberic, dodecanedioic, hexadecanedioic acids and their derivatives, especially the corresponding diacid halides which are more reactive. The latter form polymers readily by the interfacial polymerization technique with diacid chlorides or bromides. Also useful are dibasic acids or acid halides having aromatic residues in the chain such as of isophthalic or terephthalic acid. The resulting polyamides have the units as represented above separated by divalent radicals of the formula

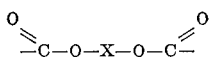

wherein R is hydrocarbyl diradical or arylene radical of 6–14 carbons, preferably free from non-aromatic unsaturation as derived from terephthalic acid, isophthalic acid, 2,6-naphthalic acid, 2,7-naphthalic acid, 2-6-anthrancene-dicarboxylic acid and 2,7 - anthracenedicarboxylic acid. Thus R can be a polymethylene chain or an aromatic diradical.

Polyurethanes having the repeating units of the type described are also included. These have the diamino moiety separated by ester groups, i.e., in the divalent radical

wherein X is alkylene or oxygen-interrupted alkylene radical of 2–14 chain atoms, such as $-(O-CH_2CH_2)_nO-$ wherein $n$ is a number of generally 1–4. Other oxygen-containing radicals are propylene oxide and butylene oxide. The polymer-forming intermediates are easily obtained by reaction of the appropriate glycol with phosgene to give the chloroformates,

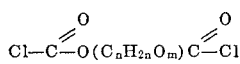

wherein $C_nH_{2n}$ or $C_nH_{2n}O_m$ represent residues of ethylene glycol ($n=2$, $m=1$), polyethylene glycol ($n=4, 6, 8, 10$, $m=1–4$), propylene glycol and polypropylene glycol (e.g. $n=3, 6, 9$, $m=0, 1, 2$), butylene glycol, hexamethylene glycol, etc.

Polyamines are a further type of polymer available from the novel diamines and are obtained by reaction of these diamines with a hydrocarbyl dichloride or dibromide wherein the chlorine or bromine are on aliphatic carbons. In this case the bridging means between two daimine residues is $-CH_2-Y-CH_2-$ wherein Y is alkylene of 1 to 14 carbon atoms or aryl of 6 to 14 carbons, e.g. as in methylene bromide, methylene chloride, 1,2-dibromoethane, 1,3 - dibromopropane, 1,4-dichlorobutane, xylylene dibromide, 1,16-dibromohexadecane, and the like.

The polymers are formed from the above ingredients in conventional polymer-forming reactions and the formed polymers are inert, since there is no hydrogen on amino-nitrogen and the amino-nitrogen is attached to carbon which has only one hydrogen. The polymers are useful for film and fiber applications where stability to the deleterious effects of heat and light are needed and can be used as wrapping films for many items of commerce.

The embodiments of the invention in which an exclusive property or privilege is claimed are defined as follows:

1. A film forming polymer consisting essentially of a recurring structural unit of the group

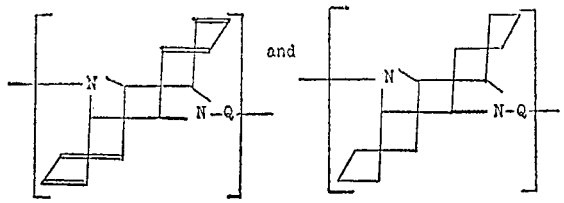

wherein Q is

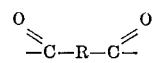

and in which
R is alkylene of 3 to 14 carbon atoms or arylene of 6 to 14 carbon atoms.

2. The polymer of claim 1 wherein the recurring structural unit contains the saturated diamine moiety and the divalent organic radical R is alkylene of 4 carbon atoms.

3. The polymer of claim 1 wherein the recurring structural unit contains the saturated diamine moiety and the divalent organic radical R is arylene of six carbon atoms.

4. The polymer of claim 1 wherein the recurring structural unit contains the saturated diamine moiety and the divalent organic radical R is alkylene of 6 carbon atoms.

5. A film of the polymer of claim 1.

6. A fiber of the polymer of claim 1.

References Cited

UNITED STATES PATENTS 3,301,827   1/1967   Martin _____ 260—78

HAROLD D. ANDERSON, Primary Examiner

U.S. Cl. X.R.

260—2 R, 77.5 B

UNITED STATES PATENT OFFICE
CERTIFICATE OF CORRECTION

Patent No. 3,635,912　　　　　　　Dated January 18, 1972

Inventor(s) Alexander L. Johnson

It is certified that error appears in the above-identified patent and that said Letters Patent are hereby corrected as shown below:

Col. 4, the second member in the equation should be changed from

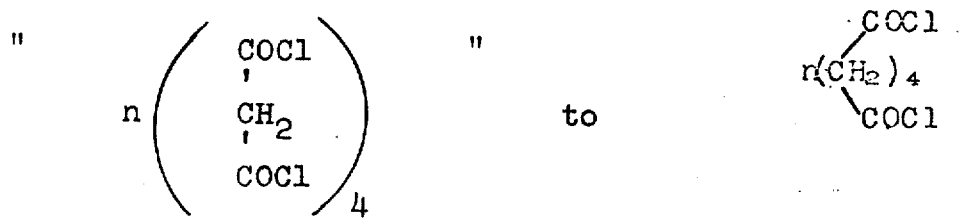

Col. 5, line 1　"$[6.4.2.1^{2,7}]$" should be

-- $[6.4.1.1^{2,7}]$　--

Col. 5, line 13 - " $CO_2H$)" should be　-- ($CO_2H$) --

Col. 7, lines 31 and 32, change "wherein D is a divalent organic radical selected from the " to read -- wherein D is a divalent organic radical selected from the group consisting of --

PO-1050
(5/69)

UNITED STATES PATENT OFFICE
CERTIFICATE OF CORRECTION

Patent No. 3,635,912      Dated January 18, 1972

Inventor(s) Alexander L. Johnson

It is certified that error appears in the above-identified patent and that said Letters Patent are hereby corrected as shown below:

Col. 8, line 9, correct the spelling of "anthracene"

Col. 8, line 42, correct the spelling of "diamine ".

Signed and sealed this 20th day of March 1973.

(SEAL)
Attest:

EDWARD M. FLETCHER, JR.
Attesting Officer

ROBERT GOTTSCHALK
Commissioner of Patents